Aug. 24, 1954
A. A. BAKER
2,687,141
WALL HYDRANT
Filed Jan. 15, 1951
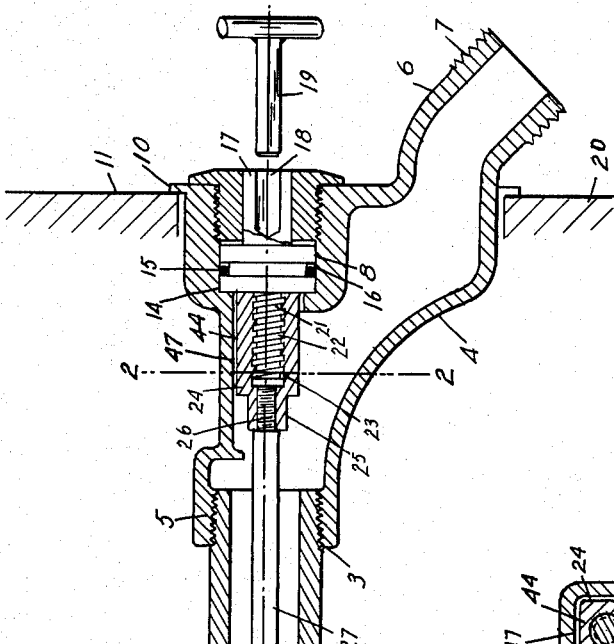
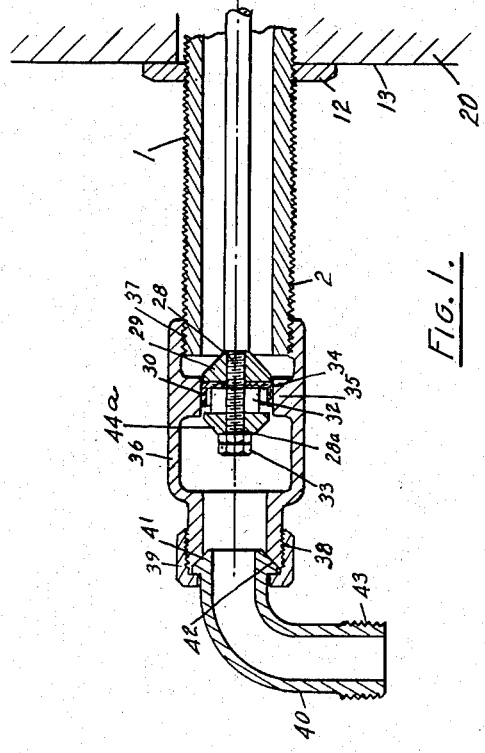
INVENTOR.
ALBERT A. BAKER
BY
Florian G. Miller
Atty.

Patented Aug. 24, 1954

2,687,141

UNITED STATES PATENT OFFICE 2,687,141

WALL HYDRANT

Albert A. Baker, Erie, Pa., assignor to J. A. Zurn Mfg. Co., Erie, Pa., a corporation of Pennsylvania Application January 15, 1951, Serial No. 206,079

1 Claim. (Cl. 137—360)

This invention relates generally to hydrants and more particularly to wall hydrants.

Valves used in present wall hydrants provide an inadequate flow of water through the hydrant. Furthermore, considerable vibration is set up in these hydrants, resulting in violent water hammer therein and pipes connected thereto and consequent damage to the hydrant and pipes connected thereto. The valves in present hydrants are disposed in the walls of a building and, in many instances, the water therein freezes. Where a valve operated from inside of a building is used, it requires considerable time to open an inside valve and then an outside valve. There is excessive wear on the seats and valve members in present hydrants.

It is, accordingly, an object of my invention to overcome the above and other defects in present wall hydrants and it is more particularly an object of my invention to provide a wall hydrant which is simple in construction, economical in cost, economical in manufacture, and efficient in operation.

Another object of my invention is to provide a wall hydrant wherein the valve therein is spaced inwardly from the inner side of the wall in which the hydrant is disposed and operated from the outside of a building.

Another object of my invention is to provide a valve in a hydrant wherein the flow rate of the water passing through the hydrant may be easily and efficiently controlled.

Another object of my invention is to provide a pressure closure valve in a wall hydrant which eliminates water hammer in the lines connected to the hydrant and consequent damage thereto.

Another object of my invention is to provide a novel combination and arrangement of parts in a wall hydrant.

Other objects of my invention will become evident from the following detailed description, taken in conjunction with the accompanying drawings, in which Fig. 1 is a longitudinal vertical sectional view taken on the axis of my novel wall hydrant; and Fig. 2 is a view taken on the line 2—2 of Fig. 1.

Referring now to the drawings, I show therein a cylindrical casing 1 threaded on the ends thereof at 2 and 3. A unitary head 4 has an internally threaded flanged portion 5 for threadable engagement with the threaded end 3 of the casing 1. The head 4 has an angularly extending spout 6 having external threads 7 for connection to any suitable hose line. The head 4 also has a counterbore 8 formed therein opposite to the flanged end 5 and in axial alignment with the end 5 and casing 1. A flanged wall plate 10 is formed integral with the head 4 for engaging the outer side 11 of a wall 20 of a building. A lock nut 12 is in threadable engagement with the threaded portion 2 of the casing 1 and engages the inner side 13 of the wall 20 of the building to secure a portion of the casing 1 and head 4 in the wall 20. A cylindrical bearing member 14 having an O-ring 15 disposed in an inner peripheral groove 16 therein is disposed in the counterbore 8 of the head 4. The bearing member 14 has an outwardly extending reduced projection 17 with a square shaped recess 18 for receiving a square ended wrench or key 19 for rotation of same. An oppositely projecting, reduced portion 21 of the member 14 has threads 22 for threadable engagement with the internal threads 23 of a sleeve 24. The sleeve 24 has a projecting, internally threaded portion 25 for threadable engagement with the threaded end 26 of a valve rod 27. The other end of the valve rod 27 has a reduced portion 28 threaded on the end 28a thereof for threadably engaging an internally threaded, conical shaped valve head 29. A cup shaped washer 30 is secured to the back of the valve head 29 by a washer 32, a conical valve member 44a, and nuts 33 in threadable engagement with the threaded end 28a of the reduced portion 28 of the valve rod 27. The washer 30 engages the internal periphery of an aperture 34 in a transverse wall 35 in the valve housing 36. The valve housing 36 is internally threaded at 37 for threadable engagement with the threaded portion 2 of the casing 1. The valve housing 36 also has the other end thereof externally threaded at 38 for threadable engagement with a threaded flange member 39 which secures the tapered union seat 41 of an L fitting 40 to the tapered union seat 42 on the end of the housing 36. The L fitting 40 is externally threaded at 43 for threadable engagement with any suitable coupling.

The conical shaped valve member 44a serves to better the flow characteristics in the hydrant. The cup shaped washer 30 provides an efficient sealing member without binding when it is moved longitudinally in the aperture 34. The upper side 44 of the member 24 is squared or flattened at 46 to engage a flattened surface 47 in the head 4 to prevent rotation of the valve rod 27.

It will be evident that the valve in my novel wall hydrant is comparatively easy to open in that the area of the valve against which the pressure of the line must work is much smaller than in the former compression type valves which were substantially the diameter of the valve housing. The tapered valve head 29 gradually opens and closes the aperture 34 in the wall 35 of the valve housing 36, thereby providing means for controlling the flow rate of water through the hydrant. This gradual opening and closing of the valve also prevents vibration and water hammer in the hydrant and pipes connected thereto, thereby eliminating damage thereto from this cause.

Various changes may be made in the specific embodiment of my invention without departing from the spirit thereof or from the scope of the appended claim.

What I claim is:

In a wall hydrant, in combination, a valve housing, a transverse wall in said housing having a cylindrical bore, a conical shaped valve head slidable in said bore to provide a valve guide, a valve rod upon which said valve head is mounted, a cup shaped washer disposed back to back with said conical shaped valve head adapted to sealingly engage with the inner side of said bore with the legs of said washer extending upstream from the base of said washer, a second conical shaped head disposed on the end of said valve rod in opposed spaced relation to said first mentioned valve head with the bases of said conical valve heads adjacent said washer, a unitary head adapted to be disposed in a wall and having a spout disposed externally of said wall, a casing connecting said valve housing and said unitary head, said valve rod extending through said casing, means in said head for moving said valve rod and conical shaped heads longitudinally in the bore in the wall of said head to a valve open position whereby fluid flows through said head and casing to the spout in said housing, said means in said head comprising a counterbore in said head, a cylindrical bearing rotatably mounted in said counterbore, a sealing means disposed in a peripheral groove in said bearing and in sealing engagement with said counterbore, a threaded member formed on said bearing, said threaded member being in threaded engagement with a female threaded member on said valve rod, said female member being flattened on one side and said flattened side being in engagement with a flattened portion of said head whereby said valve rod is held against rotation upon rotation of the bearing member.

References Cited in the file of this patent

UNITED STATES PATENTS

| Number | Name | Date |
|---|---|---|
| 505,596 | Decrow | Sept. 26, 1893 |
| 536,801 | Gaghan | Apr. 2, 1895 |
| 1,083,291 | Miller et al. | Jan. 6, 1914 |
| 1,313,889 | Ford | Aug. 26, 1919 |
| 1,317,789 | Hoar | Oct. 7, 1919 |
| 2,244,993 | Hollifield | June 10, 1941 |